United States Patent Office 2,929,217
Patented Mar. 22, 1960

2,929,217

WORKING MEDIUM CONTROL SYSTEM FOR A CLOSED CIRCUIT GAS TURBINE POWER PLANT

John S. Collman, Detroit, Mich., assignor to General Motors Corporation, Detroit, Mich., a corporation of Delaware Application June 11, 1957, Serial No. 665,011

5 Claims. (Cl. 60—59)

My invention relates to systems for storing, supplying, and withdrawing gas, and particularly to closed circuit gas turbine power plants with improved means for storage of the working medium.

By way of summary, the invention involves the use of a number of reservoirs for the working medium operating at progressive pressure ranges, with means to connect the reservoirs selectively to a point of high pressure in the system or a point of low pressure. The invention makes it possible to add working medium to the operating circuit of the power plant or withdraw it without using auxiliary compressors to transfer the working medium. It also results in a relatively small total volume of the storage reservoirs.

The nature of the invention will be clearly apparent from the succeeding detailed description of the preferred embodiment thereof and the accompanying drawings.

Figure 1:
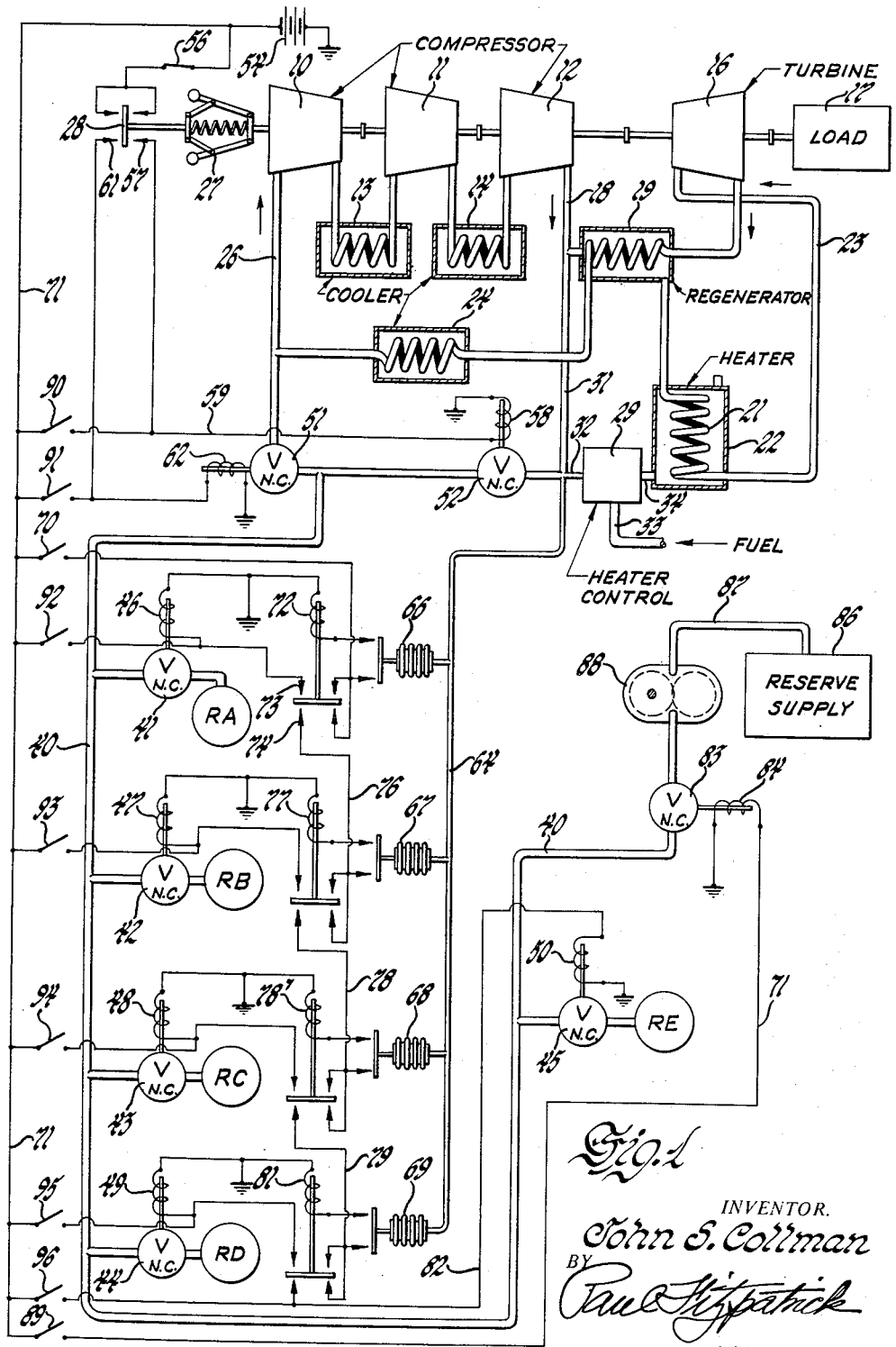
Figure 1 is a schematic diagram of a closed circuit gas turbine power plant incorporating the invention.

Referring first to Figure 1, the working circuit of the power plant, which is of known configuration, will be first described. The power plant includes three series-connected compressors, 10, 11, and 12 with intercoolers 13 and 14 connected between the compressors. The three compressors are effectively one compressor and are connected to be driven by a turbine 16 which also supplies power to a driven device indicated as load 17. Working medium flows from the high pressure compressor 12 through its outlet line 18, a regenerator 19, a heating coil 21 of a heater 22, and line 23 to the inlet of the turbine. The turbine exhaust flows through the regenerator 19 for heat exchange with the compressor discharge gas and through a cooler 24 to the inlet line 26 of the low pressure compressor. The speed of the turbine, load device, and compressors is controlled by a governing mechanism indicated as a fly-ball device 27 driven by the turbine and operating a single pole double throw switch 28 which controls the quantity of working medium in the circuit, as will be described.

The temperature of the working medium entering the turbine is maintained substantially constant by any suitable control appropriate to the requirements of the system. As illustrated, compressor outlet pressure is communicated to a heat control device 29 through lines 31 and 32. The heat control device may control fuel supplied through line 33 and delivered through line 34 to the heater. The control may simply vary the rate of fuel supply in acordance with the pressure level of the system to keep the turbine inlet temperature substantially constant. As a result, temperatures at any other point in the circuit will also be substantially constant. If the turbine inlet temperature is maintained constant, the power output of the system may be varied as required to drive the load at the speed set by the governor 27 by varying the pressure level of the motive fluid.

To clarify the succeeding discussion, certain terms used will be defined. "High pressure" is the working circuit pressure from the compressor outlet to the turbine inlet. "Low pressure" is the working circuit pressure from the turbine outlet to the compressor inlet. The small pressure drops in the piping and heat exchangers are disregarded. The high and low pressures remain constant in normal operation unless the quantity of working medium in the working circuit is changed. "Pressure ratio" is the ratio of high pressure to low pressure and is essentially constant in a constant speed power plant. "Pressure level" is a measure of the quantity of working fluid. While this might be expressed as average system pressure, it is convenient to take the high pressure as defining the pressure level. The low pressure will then be the pressure level divided by the pressure ratio. A "pressure range" is a range of pressure levels, represented by a range of values of high pressure with a corresponding range of low pressure. Pressure range may be expressed as a ratio of the upper and lower limits of the range. The motive fluid reservoirs also have pressure ranges. "Maximum pressure" is the highest value of the high pressure.

In closed circuit gas turbine systems, the pressure ratio is frequently rather small. Particularly, where helium is employed as the working medium, the pressure ratio may be near the 2.63 to 1 value taken here as illustrative. Also, where helium is used as the working medium, it is important to store any helium withdrawn from the system as pressure level is decreased. A helium system is described herein, although this is merely illustrative, as the system is applicable to other working media.

It has been proposed to control pressure level in closed circuit power plants by discharging fluid to a low pressure reservoir to reduce the pressure level in the working circuit, and to provide a high pressure reservoir and an auxiliary power driven compressor by which the medium is pumped from the low pressure reservoir to the high pressure reservoir. To make up the working medium in the working circuit, it is then delivered to the working circuit from the high pressure reservoir. One of the advantages of my invention is the elimination of such auxiliary compressors.

Systems employing helium or in which, for any reason, it is desirable to store the working medium, are different from systems employing air as the working medium, in which the air may be vented from the system and may be made up from the surrounding atmosphere by an auxiliary compressor.

It is also possible, if the working medium is air and the system is so operated that, over the entire pressure range, the low pressure remains below atmospheric pressure and the high pressure remains above atmospheric pressure, to vary the pressure level by admitting air to the low pressure part of the circuit from the atmosphere or discharging it from the high pressure part of the circuit to the atmosphere. Such a mode of operation is limited to systems employing air with a high pressure ratio and a rather low maximum pressure in the system.

My system is applicable to power plants operating at a high maximum pressure and low pressure ratio. As illustrated herein, the low pressure of the system ranges from 38 lbs. to 380 p.s.i.a., and the high pressure in the system ranges from 100 to 1,000 p.s.i.a., the pressure ratio thus being 2.63 and the total pressure range ratio being 10 to 1.

The working medium is stored in a number of reservoirs. A pressure range ratio of 10 to 1 with a pressure ratio of 2.63 to 1 can be achieved with economy of volume of storage reservoirs if five storage reservoirs are employed, as illustrated in Figure 1. The several reservoirs, RA, RB, RC, RD, and RE are connected to a manifold 40 through valves 41 to 45, respectively. These are normally closed valves opened by the solenoids 46 to 50, respectively. Manifold 40 is connected to a working circuit pressure level increasing valve 51 and a pressure level reducing valve 52. Valve 51 connects manifold 40 to the compressor inlet line 26 and valve 52 connects manifold 40 to the compressor outlet line 18 through line 31. Power for actuation of valves 50 and 51 is supplied from a source illustrated as a battery 54 through a normally closed switch 56 to the front and back contacts of switch 28 operated by the turbine speed responsive device 27. When the turbine overspeeds, switch 28 closes its front contacts 57, energizing solenoid 58 through line 59, and thus opening valve 52. When the turbine underspeeds, back contacts 61 of switch 28 are closed, energizing solenoid 62 of valve 51. The valves 51 and 52, under control by the speed responsive device 27, thus determine whether helium is added to or taken from the system.

Figure 2:
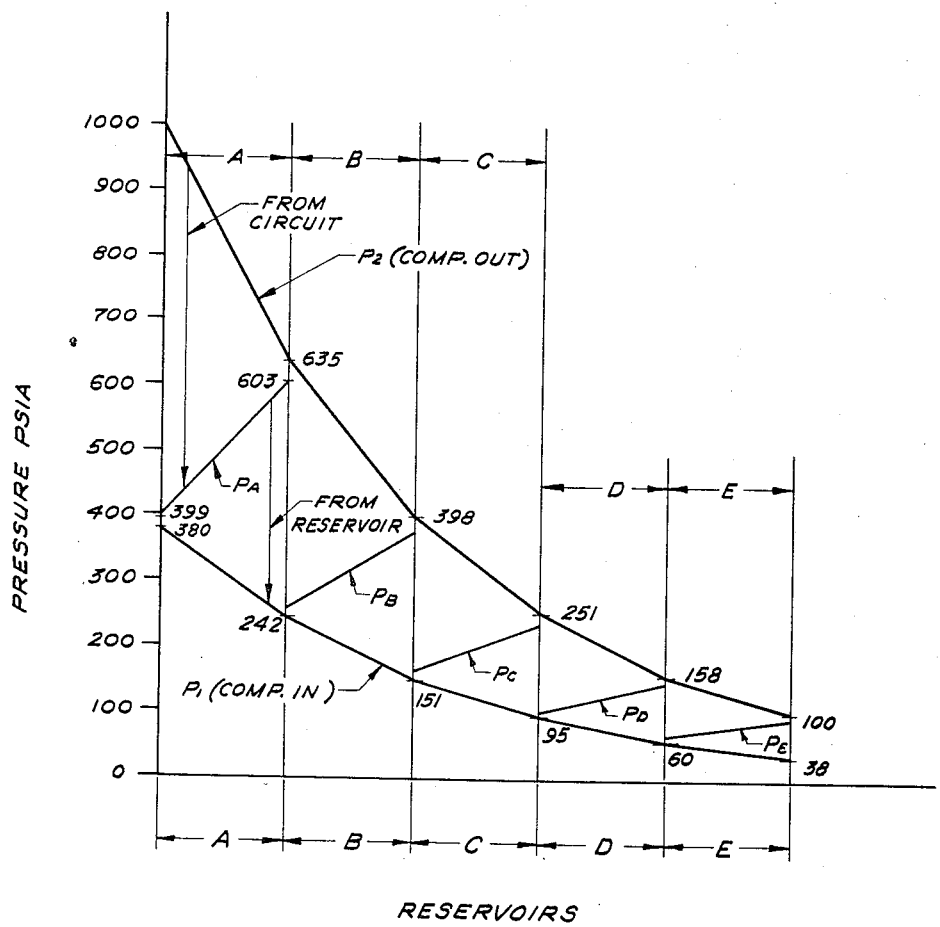
Figure 2 is a graphical representation of the pressure level ranges in a typical system.

The manifold 40 is connected to whichever of the five reservoirs is at the appropriate pressure in relation to working circuit pressure level. Using the pressure ratio and pressure ranges referred to above, as illustrated on Figure 2, reservoir RA is the highest pressure reservoir, the pressure level of which varies from 603 p.s.i.a. when fully charged to 399 p.s.i.a. when it is at its lowest pressure level. The remaining reservoirs operate over pressure ranges progressively decreasing from that of RA. RB operates over the range from 378 to 256; RC from 239 to 158; RD from 150 to 100; and RE from 95 to 63. The working circuit can be charged from RA by connecting RA to the compressor inlet whenever the inlet pressure is in the range from 242 lbs. to 380 lbs. The medium can be bled from the circuit to RA whenever the compressor outlet pressure is between 1,000 lbs. and 635 lbs. These two pressure ranges correspond to the range indicated as A in Figure 2. Similarly, the system pressure can be varied by connection to reservoir RB whenever the pressure level is in the range B from 635 lbs. to 398 lbs. The values for the other reservoirs will be apparent from Figure 2.

As will be seen, the maximum pressure of a given reservoir is slightly less than the minimum compressor outlet pressure of the particular range in which it withdraws medium from the circuit, and the minimum pressure of any reservoir is slightly higher than the maximum pressure to which it supplies medium to the circuit, to provide a head for fluid flow. The pressure ranges of the reservoirs are essentially contiguous (except for the flow head allowance) and, based on the assumption that the reservoirs are of equal volume, the pressure ranges increase in geometric progression. The actual pressure range ratio of a given reservoir depends upon the ratio of its volume to that of the volume of the working circuit as well as upon the pressure ratio of the system.

The reservoirs may, of course, be selectively connected by an operator of the power plant to the working circuit so as to supply fluid to the circuit from, or withdraw it from the circuit to, whichever reservoir has a pressure range commensurate with the pressure level of the working circuit. However, it is desirable for normal operation of the system to provide automatic control of the pressure level. Such control may respond to any factor appropriate to the particular power plant.

The speed control which determines changes in pressure level has been mentioned. The selection of a particular reservoir for supply or storage of medium is effected by a control responsive to system pressure level. As illustrated, the high pressure is employed for control. A control line 64 communicating with the compressor outlet through lines 31 and 18 is connected to four pressure responsive switch devices, 66, 67, 68, and 69. These pressure switches are set to close respectively at 635, 398, 251, and 158 p.s.i.a. in the chosen example. These are the values of high pressure which are the dividing points between the ranges of system pressure level in which the five reservoirs are connected, as will be apparent from Figure 2.

The pressure closed contacts of switch 66 are connected to the current source 54 through a bus 71 and a normally closed manually operable switch 70. When switch 66 closes, it energizes relay 72, closing front contacts 73 thereof, which energize solenoid 46 to open valve 41. At pressures below 635 lbs., bus 71 is connected by back contacts 74 of relay 72 to line 76 connected to pressure switch 67 and to front and back contacts of relay 77. The front contacts of relay 77 are connected to solenoid 47 and the back contacts to a line 78 leading to pressure switch 68 and front and back contacts of relay 78'. The front contacts of relay 78' energize solenoid 48 and the back contacts energize line 79 leading to pressure switch 69 and the front and back contacts of relay 81. The front contacts of this relay energize solenoid 49 and the back contacts are connected through a line 82 to solenoid 50 which opens valve 45. As will be seen, this chain circuit will cause only one of the five solenoids 46 to 50 to be energized at a time. Assuming the pressure is above 635 lbs., all the pressure switches will be closed, but current will be supplied only to switch 66, since relay 72 will be energized. Thus, valve 41 will be open and valves 42 to 45 will be closed. When the pressure drops below 635 lbs., pressure switch 66 opens, de-energizing relay 72 and solenoid 46, and the back contacts of relay 72 energize solenoid 47 through line 76 and the front contacts of relay 77. Similarly, below 395 lbs., pressure switch 67 opens, closing valve 42 and opening valve 43. At 251 lbs., pressure switch 68 opens and valve 44 is opened, and at 158 lbs., pressure switch 69 opens and valve 45 is opened by the back contacts of relay 81. As each relay drops out to energize the next lower pressure valve solenoid, it de-energizes the previously energized valve solenoid. With increase in pressure from a low level, the sequence of operations is reversed.

In such installations, it is desirable to provide a reserve supply of helium to make up any losses, and this reserve supply may be connected to manifold 40 by a valve 83, illustrated as a normally closed valve opened by a solenoid 84. Valve 83 connects the reserve supply tank 86 to the manifold through a line 87 which may include a suitable compressor or pump 88, if needed. Solenoid 84 is energized from bus 71 through a manually operable switch 89.

Provision is made for operating the system under manual control, which may be desirable for starting purposes or to correct the pressure levels in the reservoirs RA to RE. The speed responsive control of valves 51 and 52 may be disabled by opening switch 56 and pressure switches 66 to 69 by opening switch 70. Valves 51 and 52 may be opened manually by closing switches 91 and 90, respectively, to connect the operating solenoids of the valves to bus 71. Solenoids 46 to 50, respectively, may be individually energized from the bus by manually operable switches 92 to 96, respectively.

It will be understood that suitable pressure gauges connected to the working circuit and the several reservoirs RA to RE may be provided, and that the working fluid may be added to or taken from the system by operation of switches 91 or 90 with simultaneous operation of the one of the switches 92 to 96 which will connect the manifold to the reservoir which is at the appropriate pressure level.

By leaving valves 51 and 52 closed, and opening two of valves 41 to 45, pressure may be bled from a higher pressure reservoir into a lower one. Also, by opening valve 83 and one of the reservoir valves, fluid can be supplied from the reserve supply. The reserve supply also can be connected to the working circuit.

The speed responsive control illustrated is not adapted to starting of the system, which ordinarily is accomplished at a low pressure level and with speed gradually increasing from zero. By exercising manual control, the pressure level may be increased as desired during the starting cycle.

With the modest compressor ratio of 2.63 to 1, the pressure level may be reduced by 37½% by employing a single reservoir of a volume approximately two-thirds that of the working circuit. The exact ratio of volume depends upon the relative proportions of the working circuit which are under high and low pressure, and upon the temperature levels in the working circuit. With five reservoirs, as illustrated, with the same pressure ratio, the system pressure level may be varied over the range of 10 to 1.

While the total reservoir volume is greater than would be necessary if only a single low pressure reservoir and a single high pressure reservoir were provided, with a compressor to pump the fluid from the one to the other, the difference is not as great as might be expected. A single high pressure reservoir capable of containing (at the maximum pressure of reservoir A) all the gas contained in the five reservoirs when they are filled would be approximated two-and-a-half times as large as RA, and it would necessarily be strong enough to withstand the highest pressure level. Also, a low pressure receiver for gas bled from the circuit would be required. In the system according to the invention, the reservoirs of lower pressure may be of lighter construction than the higher pressure reservoirs.

It is to be understood that the invention is not limited to control of pressure level by turbine speed, since the particular quantity relied upon for pressure level control may be selected so as to be accordant with the best operation of a particular system and the nature of the overall controls therefor. Factors influencing the choice of a quantity for pressure level control include the nature of the circuit and the type of heat source as well as matters of choice as to control of heat release and of power delivered by the system. The elementary closed circuit gas turbine system illustrated is sufficient, however, to explain the principles of the invention, which may be incorporated in any closed circuit gas turbine system in which the pressure level is varied.

The detailed description of the preferred embodiment of the invention for the purpose of explaining the principles thereof is not to be construed as restricting the invention. Many modifications of structure may be made by exercise of skill in the art within the principles of the invention.

I claim:

1. In combination, a gas turbine power plant including a compressor, a heater, a turbine, and a cooler connected in a closed circuit for flow of a working medium through the circuit, and means for varying the quantity of working medium in the circuit comprising a number of working medium reservoirs operable through progressive contiguous ranges of pressure level of the working medium and means operable for selectively connecting each reservoir alternatively to a first point in the said circuit at which the pressure is substantially compressor inlet pressure to add working medium to the circuit or to a second point in the said circuit at which the pressure is substantially compressor outlet pressure to withdraw working medium from the circuit.

2. In combination, a gas turbine power plant including a compressor, a heater, a turbine, and a cooler connected in a closed circuit for flow of a working medium through the circuit, and means for varying the quantity of working medium in the circuit comprising a number of working medium reservoirs operable through progressive contiguous ranges of pressure level of the working medium and means operable for selectively connecting each reservoir alternatively to a first point in the said circuit at which the pressure is substantially compressor inlet pressure or to a second point in the said circuit at which the pressure is substantially compressor outlet pressure, the last-named means including means responsive to a conditoin indicative of power demand on the plant for connecting the reservoir which is connected selectively to the first point for increasing the pressure level or to the second point for reducing the pressure level and including means responsive to pressure level at a point in the circuit for selecting the reservoir to be connected.

3. In combination, a gas turbine power plant including a compressor, a heater, a turbine, and a cooler connected in a closed circuit for flow of a working medium through the circuit, the compressor having a substantially constant pressure ratio in normal operation of the power plant, and means for varying the quantity of working medium in the circuit comprising a number of working medium reservoirs operable through progressive contiguous ranges of pressure level of the working medium, the ratio of maximum to minimum pressure of the pressure range of each reservoir being a fraction of the said compressor pressure ratio, a manifold, means operable for selectively connecting the manifold alternatively to a first point in the said circuit at which the pressure is substantially compressor inlet pressure to add working medium to the circuit or to a second point in the said circuit at which the pressure is substantially compressor outlet pressure to withdraw working medium from the circuit, and means for selectively connecting the reservoirs to the manifold.

4. In combination, a gas turbine power plant including a compressor, a heater, a turbine, and a cooler connected in a closed circuit for flow of a working medium through the circuit, the compressor having a substantially constant pressure ratio in normal operation of the power plant, and means for varying the quantity of working medium in the circuit comprising a number of working medium reservoirs operable through progressive contiguous ranges of pressure level of the working medium, the ratio of maximum to minimum pressure of the pressure range of each reservoir being a fraction of the said compressor pressure ratio, and means operable for selectively connecting each reservoir alternatively to a first point in the said circuit at which the pressure is substantially compressor inlet pressure or to a second point in the said circuit at which the pressure is substantially compressor outlet pressure, the last-named means including means connected to the power plant responsive to pressure level demand of the circuit for connecting the reservoir selectively to the first point for increasing the pressure level or to the second point for reducing the pressure level and including means responsive to pressure level in the circuit for selecting the reservoir to be connected.

5. In combination with a thermal power plant of the character described including means defining a closed working medium circuit and employing a gaseous working medium circulating in the said working medium circuit, the medium being at a high pressure in a first portion of the circuit and at a pressure substantially lower than the high pressure in a second portion of the circuit, a storage system for the medium comprising, in combination, a plurality of reservoirs for the medium, means for charging the reservoirs to progressively different pressure levels, and means for selectively connecting any one of the reservoirs to the working medium circuit, the connecting means including means for connecting the selected reservoir alternatively to the first portion of the circuit to withdraw working medium from the circuit or to the second portion of the circuit to add working medium to the circuit.

References Cited in the file of this patent

UNITED STATES PATENTS

| 2,172,910 | Keller | Sept. 12, 1939 |
| 2,345,950 | Salzmann | Apr. 4, 1944 |
| 2,453,886 | Ackeret | Nov. 16, 1948 |

FOREIGN PATENTS

| 224,738 | Switzerland | Mar. 16, 1943 |